July 31, 1945.   T. SCHNEIDER   2,380,470
MOUNTING FOR AUTOMATIC FIREARMS ARRANGED ON AIRCRAFT
Filed May 18, 1940
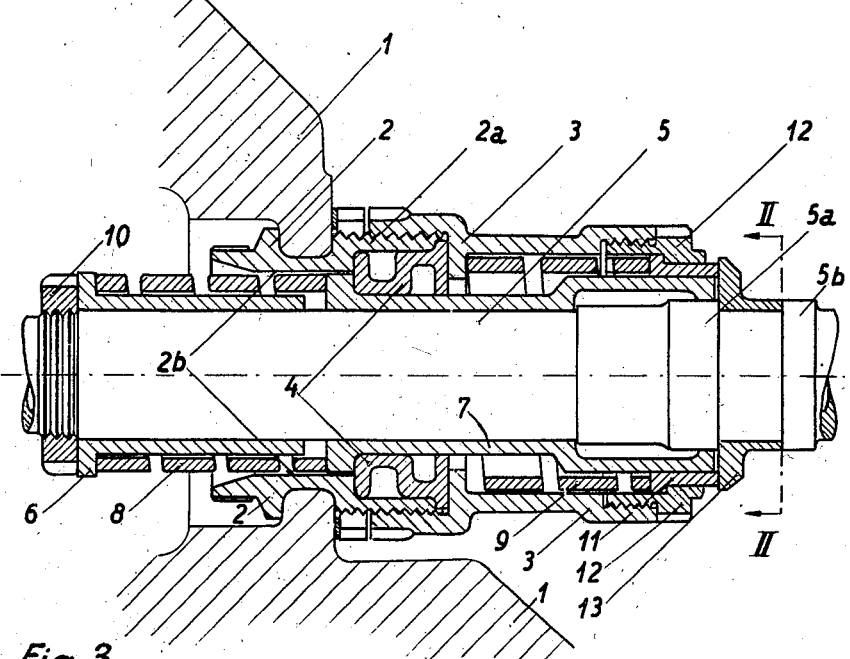
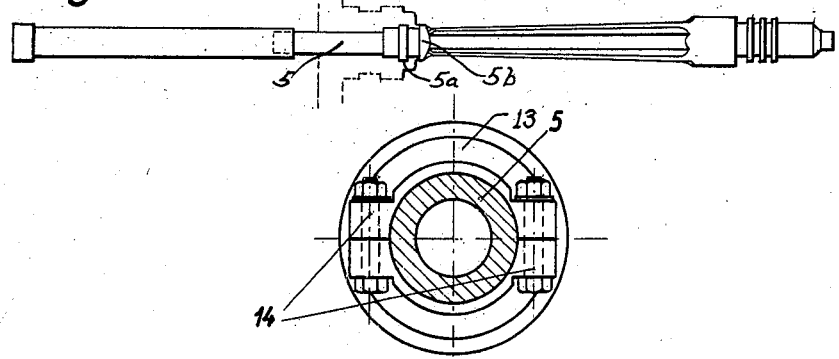
INVENTOR
T. SCHNEIDER
BY
Lackenbach + Hirschman
ATTORNEYS Patented July 31, 1945

2,380,470

UNITED STATES PATENT OFFICE 2,380,470

MOUNTING FOR AUTOMATIC FIREARMS ARRANGED ON AIRCRAFT

Theodor Schneider, Zurich, Switzerland

Application May 18, 1940, Serial No. 335,916
In Switzerland May 25, 1939

7 Claims. (Cl. 89—37.5)

The invention relates to a mounting for automatic fire arms, and more particularly to a mounting of this type for use in aircraft.

It is an object of the invention to provide a gun mounting so constructed that the barrel of the gun may be replaced from in front of the aircraft.

It is a further object of the invention to provide an improved gun mounting associated with recoil damping mechanism comprising a pre-tensioned suspension system, such mounting taking up a minimum of space and making possible the changing of the barrel in a very simple manner without the necessity of dismantling many parts.

In order to dampen the recoils in automatic fire-arms built in aircraft, it is known to brake the axial movement yieldably in a pre-tensioned suspension system. One known construction includes a completely independent installation of two pre-tensioned suspension systems, such that the pre-tension of the relieved suspension system is maintained, uninfluenced by the loading of the other system. This arrangement is so contrived that the front portion of the barrel is connected with the part of the aircraft serving as a supporting wall by means of a retaining device which receives the springs. In this retaining device, the weapon, with the barrel in the firing direction, is inserted and connected with it.

The barrel is provided with a collar which acts as an abutment for the rear spring, and the front spring abuts on a threaded sleeve screwed on to the barrel from the front. In arrangements of automatic weapons in aircraft, the limited space available must generally be taken into account. In the majority of the installations of this type, the mounting of the weapon is made very difficult by the restricted space conditions. Since the work, particularly of changing a barrel, should not be too protracted, the known mode of mounting and suspension of the weapon represents a considerable difficulty in the assembly or dismantling of the barrel.

Whilst maintaining the pre-tensioned suspension, the present invention eliminates the said difficulty by using as the barrel abutment for the rear spring, a two-part abutment which is capable of being inserted radially between collar-like thickenings of the barrel, and as a stop for the flange lying in the intermediate ring and forming part of the sliding bush whose opposite, enlarged end surrounds the front collar of the barrel, there is provided a split insert ring which is capable of being inserted radially and after the removal of which the barrel as well as the sliding bush can be dismantled in a forward direction. The result of this arrangement is that in the mounting or changing over of the barrel, the locking sleeve need only be moved backwards very little or even not at all.

One constructional form of the invention is shown, by way of example, on the accompanying drawing, wherein, Fig. 1 is a longitudinal section of the mounting;

Fig. 2 is a section on the line II—II of Fig. 1;

Fig. 3 is a side elevational view of the mounting, showing the arrangement of the barrel in the airplane.

Referring to the drawing:

1 is that part of the aircraft, for example, an engine housing, serving as a support, and 2 is an intermediate ring rigidly mounted therein and having an external thread 2a on the end directed towards the locking sleeve. On the screw thread 2a, there is screwed the locking sleeve 3, which clamps a two-part insert ring 4 arranged in an enlarged portion of the intermediate ring 2, the internal diameter 2b of the intermediate ring being greater than that of the insert ring. The barrel 5 of the weapon is surrounded by two bushes 6 and 7 which have a push-fit thereon The front bush 6 is pressed against a threaded collar 10, screwed on to the barrel 5, by means of a front helical spring 8 which surrounds the bush and abuts against a flange formed on the bush. A front flange on the bush 7 slidingly embracing the barrel 5 is forced by the spring 8 against the insert ring 4.

A rear helical spring 9 surrounds the bush 7 and bears at its front end against an inwardly directed flange on the sleeve 3 and at its rear end against a bush 11 slidably mounted on an enlarged portion of the rear bush 7 and held in the axial direction by a threaded ring 12 screwed into the sleeve 3. Against the rear end of the bush 11, there abuts a two-part support 13 which is firmly embedded between collars 5a, 5b of the barrel 5. Two bolts 14 serve to connect the two parts of the abutment or support 13.

The invention illustrated is employed as follows. The bush 7, the spring 8 and the bush 6 are successively pushed on to the barrel 5 before the latter is assembled in the mounting and the threaded collar 10 is then screwed on. The barrel is then pushed in toward the right as viewed in Fig. 1, i. e. from the side of the bearing part 1 which faces away from the locking sleeve, through the bore 2b of the intermediate ring 2. Thereupon, the two-part insert ring 4 is positioned in the intermediate ring 2 and the locking sleeve 3 is screwed on to the thread 2a. The spring 9 is then arranged in position, the bush 11 is pushed on to the bush 7 and, by screwing the threaded ring 12 into the sleeve 3, the bush 11 is slightly drawn into the latter.

When all the above parts are loosely arranged on the barrel, the latter is pushed so far backwards until its connection with the locking sleeve on the breech casing (not shown) can take place, the connection then being made and secured. The insert ring 4 is now clamped by the sleeve 3 and by tightening the bush 11 through the threaded ring 12, the rear spring 9 is pre-tensioned. The two-part support 13 is then arranged on the barrel 5 by inserting its two halves radially in the groove between the collars 5a and 5b and securing the halves therein with the bolts 14. Thereupon the threaded collar 10, which hitherto had been only slightly tightened, is screwed up until the front spring 8 has reached the desired initial tension. As will be seen, the novel mounting of the barrel requires very little space and the locking sleeve can remain in position when the barrel is being changed.

I claim:

1. In a recoil mounting for an automatic firearm arranged on an aircraft, the combination with a removable barrel, of an intermediate supporting ring adapted to be rigidly positioned on an aircraft, said barrel being axially displaceable in said supporting ring, an initially tensioned spring system comprising a front and a rear spring, yieldably acting on said barrel in both directions of movement, a sliding bush surrounding said barrel and provided with a flange at its front end, said supporting ring having an enlarged portion within which is positioned a multi-part insert ring, said front spring bearing against the flange on said sliding bush to urge the latter against said insert ring, said barrel having two collars disposed towards its rear, a multi-part support inserted between said two collars of the barrel and bolted together and acting as a stop for said rear spring, said barrel being removable from the front of the aircraft upon removal of said insert ring and support.

2. In a recoil mounting for an automatic firearm arranged on an aircraft, the combination with a removable barrel of an intermediate supporting ring adapted to be rigidly positioned on an aircraft, said barrel being axially displaceable within said supporting ring, a front and a rear spring surrounding said barrel and yieldably acting on said barrel in both directions of axial movement, a sliding bush surrounding said barrel and provided with a flange, a multi-part insert ring positioned within said supporting ring, said front spring acting against the flange on the sliding bush to urge the latter against the insert ring, said barrel having two collars adjacent to each other, a multi-part support inserted between said two collars of the barrel and fastened together, said support acting as a stop for the rear spring, said barrel being removable from in front of the aircraft upon removal of the multi-part insert ring and support.

3. In a recoil mounting for an automatic fire arm arranged on an aircraft, the combination with a removable barrel of a supporting ring adapted to be rigidly positioned on an aircraft, said barrel being axially displaceable within said supporting ring, an initially tensioned spring system yieldably acting on said barrel in both directions of movement, a sliding bush surrounding said barrel, and provided with a flange, a multi-part insert ring positioned within said supporting ring, said spring system acting against the flange on said sliding bush to urge the latter against the insert ring, said barrel having two integral collars at the rear thereof, a multi-part support inserted between said two collars of the barrel and releasably fastened together, said support acting as a stop for said spring system, said barrel being removable from in front of the aircraft upon removal of the multi-part insert ring and support.

4. In a recoil mounting for an automatic firearm arranged on an aircraft, the combination with a removable barrel, of a supporting intermediate ring having an enlarged portion, said ring being adapted to be rigidly positioned on an aircraft, said barrel being axially displaceable within said ring, an initially tensioned spring system comprising a front and a rear spring yieldably acting on said barrel in both directions of movement, a split, radially insertable insert ring positioned within the enlarged portion of said intermediate ring, a sliding bush surrounding said barrel and provided with a flange on its end, said bush being urged against the insert ring by the front spring acting against the flange thereon, said barrel having two collars, a multi-part support adapted to be inserted radially between two collars of the barrel and serving as a stop for the rear spring, the barrel as well as the sliding bush being capable of being dismantled in a forward direction after the insert ring and multi-part support have been removed.

5. In a recoil mounting for an automatic firearm arranged on an aircraft, the combination with a removable barrel, of a supporting intermediate ring adapted to be rigidly positioned on an aircraft, said ring having external threads thereon, a front bush surrounding said barrel, a threaded collar screwed on the forward portion of the barrel, a front helical spring surrounding said front bush and said barrel, said front bush having a flange on its front end against which the front helical spring acts to urge the flange on the bush against the threaded collar on said barrel, a second sliding bush surrounding said barrel, said sliding bush having a flange on its front end, said intermediate ring having an enlarged portion within which is positioned a two-part radially insertable insert ring, a sleeve having an inwardly directed flange and screwed on said intermediate ring, said last-mentioned flange enclosing and acting as a stop for said insert ring, said front helical spring acting against the flange on the second sliding bush to urge the same against the two-part insert ring, a rear bush slidably mounted upon said second bush and having a collar on its front end, a threaded ring screwed on said sleeve and serving to hold said rear bush against axial movement in the rearward direction, a rear spring surrounding said second bush and bearing against said rear bush and against the inwardly directed collar on said sleeve, said barrel having two collars disposed toward its rear portion, a two-part support positioned between said two collars of the barrel and releasably fastened together, said two-part support abutting against the rear end of said rear bush, whereby the barrel may be removed from in front of the mounting upon removal of the insert ring and two-part support.

6. In a recoil mounting for an automatic firearm arranged on an aircraft, the combination with a removable barrel, of an intermediate supporting ring adapted to be rigidly positioned on an aircraft, said barrel being disposed within and being axially displaceable within said intermediate ring, a spring system surrounding the barrel for dampening the recoil thereof, and stop mechanism for the spring system composed of radially insertable and removable parts, whereby upon removal of said stop mechanism, the barrel may be demounted from in front of the mounting.

7. In a mounting for automatic fire-arms arranged on aircraft, the combination, with the barrel of the fire-arm, of a sliding bush adapted to receive the barrel, a fixed intermediate ring adapted to be secured to a support and within which the sliding bush is disposed, a flange at the front end of the bush, an initially tensioned front spring acting on said flange and urging the bush rearwardly, an initially tensioned rear spring surrounding the bush, spaced, collar-like elements at the rearward portion of the barrel, a two-part support adapted to be inserted radially between said collar-like elements to serve as the stop for the rear spring, and a split, radially insertable insert ring serving as the stop for the flange of the sliding bush, said bush having an enlarged rearward portion embracing the front one of said collar-like elements on the barrel, said barrel with the sliding bush being thereby capable of being dismantled in a forward direction after the insert ring and two-part support have been removed.

THEODOR SCHNEIDER.